INVENTOR
Cecil E. Adams
BY
Wood, Herron & Evans
ATTORNEYS

INVENTOR
Cecil E. Adams
BY
Wood, Herron & Evans
ATTORNEYS

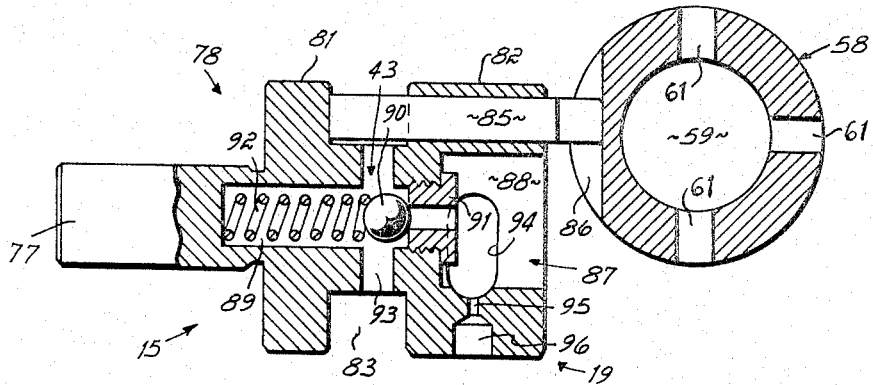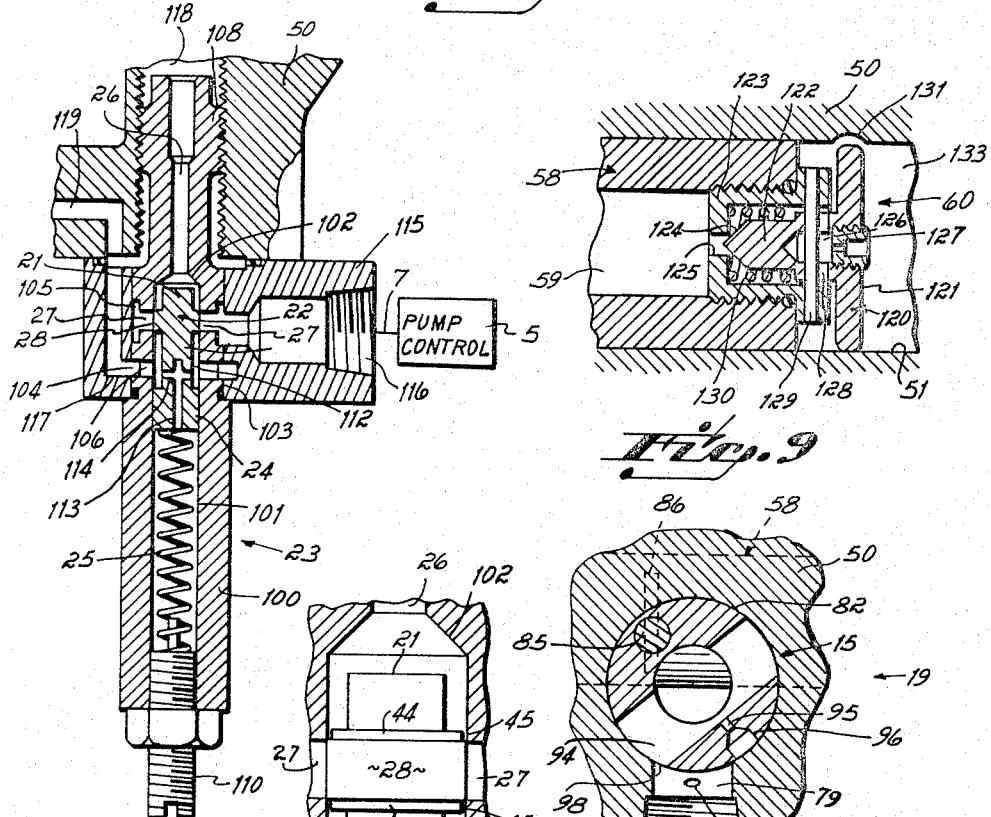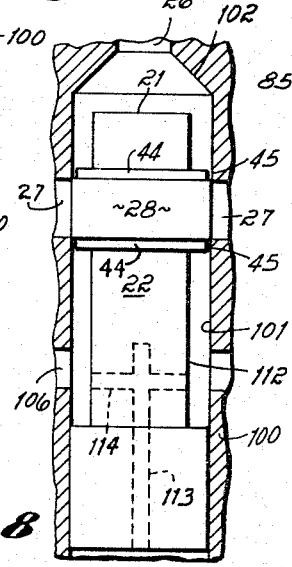

3,333,415
HYDRAULIC TRANSMISSION AND SPEED AND DIRECTION CONTROL VALVE THEREFOR
Cecil E. Adams, Columbus, Ohio, assignor to Abex Corporation, a corporation of Delaware
Filed Nov. 23, 1965, Ser. No. 509,304
23 Claims. (Cl. 60—52)

This invention relates to a hydraulic system and to a valve mechanism for use in the system to control the direction and volumetric flow rate of hydraulic fluid.

As those skilled in the art will appreciate, the single component having the greatest influence on the performance of a variable speed hydraulic drive system is the speed and direction control valve means thereof. Although the importance of the control valve means to satisfactory operation of such a system has been recognized for many years, to date no completely satisfactory valve means has been forthcoming for such use. In one respect or another, the prior art has failed to provide a valve means which affords the control, efficiency, safety, and convenience necessary for optimum performance.

To obtain maximum usefulness from a variable speed hydraulic drive system, the direction and speed control valve means should possess a number of characteristics. For example, it should be capable of infinite selection of speeds within the operating range and, at any given speed, should be insensitive to changes in motor load and/or pump speed. This allows the precise motor speed necessary for any given application to be selected and maintained notwithstanding fluctuations in load and/or pump speed.

To prevent damage to the hydraulic system and the mechanism being operated thereby, the control valve means of the system should be operable in a manner by which the system cannot be subjected to sudden accelerations, decelerations, and if the motor is reversible, to sudden direction reversals which may produce excessive pressures or shocks either in the system or the mechanism being operated. The control valve means should also be capable, when the system is not driving the load, of hydraulically blocking the motor outlet port while supplying fluid to the motor to make up for internal losses while the motor outlet port is so blocked.

The control valve means of the system should further provide for safe handling of sudden increases in motor outlet flow which may occur if the motor overrides the pump. Finally, for the convenience of the person operating the system, the control valve means should permit changes in motor speed and, if the motor is reversible, in direction, to be made by manipulation in a single plane of a single lever. A control valve means not satisfying the above desiderata will not permit the maximum utility to be derived from a hydraulic drive system.

It has been, therefore, an object of this invention to provide an improved control valve means for a variable speed hydraulic drive system which permits, by the manipulation of a singel lever in a single plane, the volumetric flow to be set at any rate within the operating range and maintained at this rate notwithstanding fluctuations in load and/or pump speed.

It has been a further object of this invention to provide an improved control valve means for a variable speed hydraulic drive system which controls the output of a variable volume pump to meet varying load requirements, thereby reducing pump wear and affording greater economies in power consumption.

In view of the foregoing objects, it has been an additional object of this invention to provide a control valve means for a hydraulic drive system in which the valve can be shifted easily through its operating positions or ranges at a slow rate, but which applies increasing resistance to forces which would shift the valve at an undesirably rapid rate, thereby avoiding the possibility of injury to the system or mechanism operated by it through hydraulic shock resulting from sudden valve movement.

It has been another object of this invention to provide a valve controlled variable speed hydraulic drive system which permits the motor outlet to be hydraulically blocked and make-up fluid provided to the motor when so blocked.

It has been yet another object of this invention to provide a control valve for a variable speed hydraulic drive system which, when the motor overrides, permits the safe handling of the excess motor fluid flowing from the motor outlet, to prevent severe pressure buildup.

The control valve in accordance with this invention includes as interlinked subassemblies a flow direction controlling spool valve and a rate of flow or motor speed controlling spool valve. As adapted for use in a system which includes a reversible hydraulic motor, the direction controller valve is shiftable through five control ranges. The construction of this direction control valve is such that in its center range, the motor inlet and outlet ports are connected to dual purpose, oppositely directed check valves which hydraulically block the motor against rotation and, in addition, provide make-up liquid to the motor circuit should leakage occur therein.

In the extreme or motor-driving control ranges of the direction controller spool valve, fluid is directed by the valve through the motor and thence to the speed controller. The direction in which the fluid circulates depends, of course, in which of the extreme ranges the direction spool is set. In addition, the direction spool, when in an extreme or motor driving range, interposes a check valve between the motor inlet and outlet ports permitting outlet fluid from the motor to recycle directly through the motor should the motor override the pump.

The remaining two direction spool ranges, located on each side of the center range and intermediate the center and extreme ranges, are motor braking ranges. With the direction spool in either of these ranges a restricted orifice is interposed in the motor outlet line providing a restricted flow path which decelerates the motor.

The other spool valve, the speed controller, is a rotary spool valve. A passageway in the speed spool cooperates with an outlet port formed in the valve body to form adjustably crossed passageways which define a variable flow metering orifice means whereby the flow rate through the motor can be regulated.

Another valve is formed in the speed control valve section to maintain the pressure drop across the variable flow metering means at a constant value. This valve is subjected to pressure on the inlet side of the variable flow orifice metering means and operates in response to pressure changes. In addition to maintaining a constant drop across the orifice means, it also admits or releases fluid from the volume control means of the pump thereby to match pump output to the desired flow rate as determined by the variable flow metering means of the speed controller.

To coordinate the motions of the speed and direction spools so that the flow rate increases from a minimum when the motor is blocked to a maximum when the motor is to be driven at full speed, a mechanical linkage is provided interconnecting the spools. This facilitates control of both direction and speed by the manipulation of a single control lever.

Flow controlling devices operating on the direction spool limit the rate at which the mechanically linked direction and speed spools can be moved by the control lever. Thus, rapid accelerations, decelerations, and direction reversals, which could produce damagingly high pressures, are avoided.

These and other objectives of the invention will become more readily apparent from the following detailed description taken in conjunction with the accompanying drawings in which:

FIGURE 6 is a partial cross-sectional view taken along lines 6—6 of FIGURE 5;

FIGURE 7 is an enlarged, cross-sectional view of the pressure responsive spool valve shown in FIGURE 4;

FIGURE 8 is an enlarged view of the spool shown in FIGS. 4 and 7 illustrating the details of the spool land with reference to the port which is sealed thereby;

FIGURE 9 is an enlarged, cross-sectional view of one of the flow control devices shown in FIGURE 3; and FIGURE 10 is a cross-sectional view, partly broken away, of the speed spool shown in FIGURE 5 in the position which it occupies when the direction spool has just entered the reverse range.

*General description*

Before turning to a detailed description of the invention, it may be helpful first to describe a hydraulic system including the features of this invention in terms of its major components and their functions.

Figure 1:
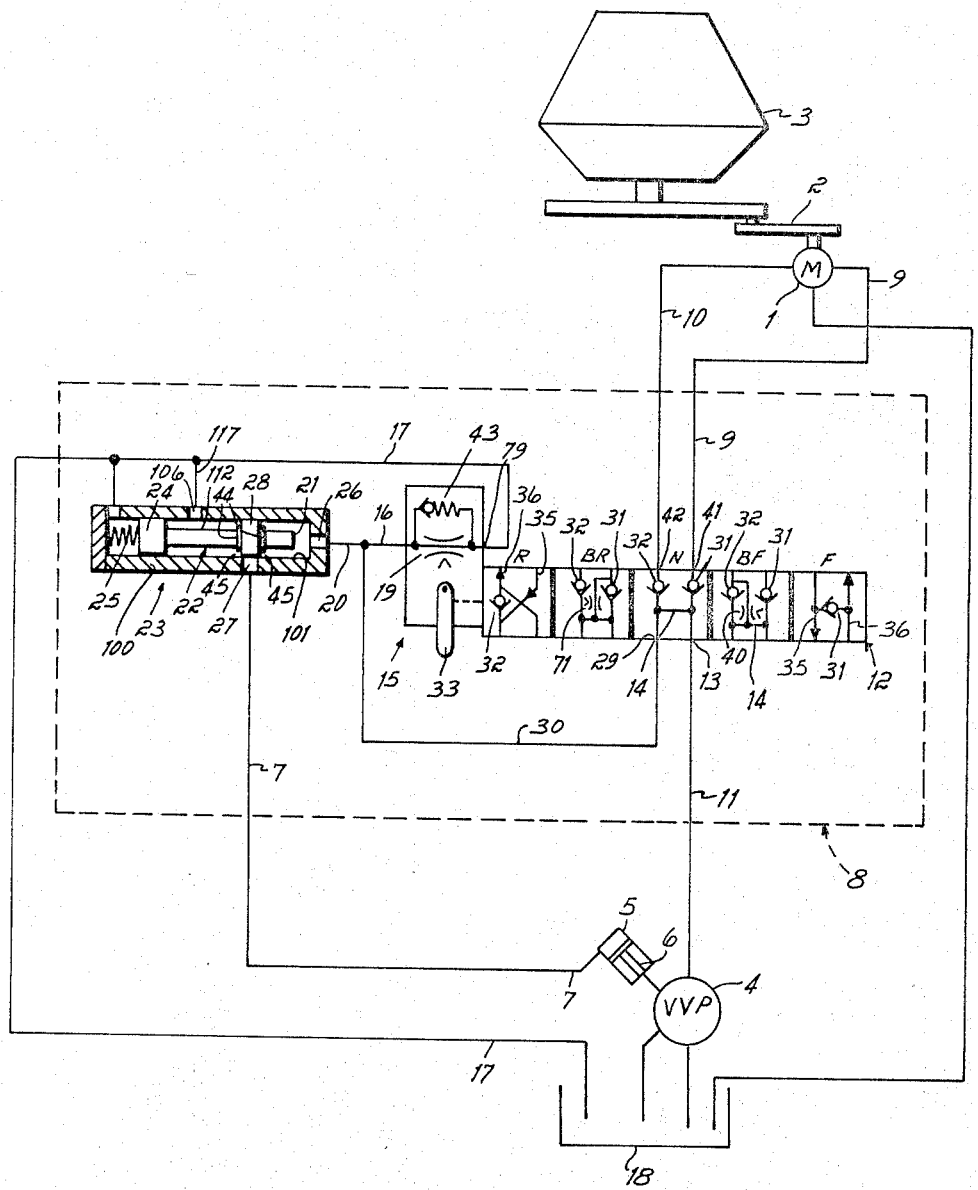
FIGURE 1 is a schematic circuit diagram of a hydraulic system in accordance with the invention as adapted to drive a concrete mixer drum, and illustrates the functions of the valve means in the various operating ranges for controlling the speed and direction of motor rotation.

As shown in FIGURE 1, the system includes a motor 1 connected through a gear reduction unit 2 to a high inertia load 3 such as a concrete mixer. A variable volume pump 4 is provided for driving the motor 1. The pump 4 has control means for changing its displacement which includes a hydraulic cylinder 5 housing a piston 6 and spring (not shown). Fluid entering the cylinder 5 via line 7 operates against the spring to move the piston 6. The motion of the piston 6 is transmitted to the hanger (not shown) of the pump 4 which functions to decrease the pump displacement. Pump displacement is increased when the spring moves the piston 6 in the opposite direction, expelling fluid from cylinder 5 via line 7. The pump shaft may be connected to the engine of the mixer truck and is powered thereby.

Between the pump 4 and the motor 1 is a special control valve shown within the dotted lines and designated generally by numeral 8. In addition to controlling the speed and direction of rotation of the motor 1, this control valve 8 has several other functions and features. One important additional function provided by this valve 8 is the measurement of the rotational speed of fluid motor 1 and adjustment of the volumetric output of pump 4 so that the speed of motor operation remains at a preselected constant value regardless of variations in pump shaft speed and/or motor loads.

In addition to controlling the direction of rotation and speed of the motor 1, the valve 8 also provides a braking function. This braking function serves to control the acceleration and deceleration of the motor 1 when the motor is externally loaded.

Moreover, valve 8 limits the rate of motor acceleration and deceleration which can be achieved by the driver of the vehicle, thereby preventing both the hydraulic circuit and the mixer itself from being subjected to the high force or stress levels attendant sudden starting or stopping.

This latter aspect of the valve control function, relating to limited acceleration and deceleration, allows lighter weight construction to be utilized in valve fabrication and results in longer life of the mechanical parts of the driven device than were heretofore possible.

The valve 8 also provides for blocking the motor ports or lines 9 and 10 when the motor is idle. This generally prevents rotation of the mixer drum 3. However, should drum rotation occur, as for example under the combined action of an off-center load in the drum and internal leakage within the fluid motor 1 or valve 8, the valve functions to supply make-up fluid to the motor via certain check valves.

Another important feature of the valve 8 is that the functions outlined above are achieved by manipulation of a single lever in a single plane.

A primary advantage afforded by the valve 8 is that for the first time it is unnecessary to use the overload relief valves or sequence valves to limit pressure peaks or surges which have necessarily been provided in former devices built for the same or similar purposes.

The general organization of the valve 8 and hydraulic system of which it forms a part will be described by considering the valve in its various positions or operating ranges. In the center, "N" or neutral position of valve 8, pressure fluid from pump outlet line 11 enters the direction control portion 12 of the valve at port 13, passes through an internal line 14, leaves the directional control portion 12 of the valve at port 29, enters the speed control section 15 via line or port 16, and after passing through variable orifice 19 in the speed control section flows through line 17 to the reservoir 18. When the valve is in the N position, variable orifice 19 is at a fixed minimum setting and will allow only a small volume of fluid to pass therethrough at the relatively low pressure drop, maintained across it, e.g., 200 p.s.i.

Branching from the inlet of orifice 19 is a line 20 which exposes the righthand end 21 of the spool 22 of a pressure compensator valve 23. The opposite or spring end 24 of spool 22 is connected to the reservoir 18 through passages including line 17. Valve 23 contains a spring 25 acting on the end 24 of spool 22 in opposition to the pressure from line 20. The usual setting of spring 25 is such that, if the pressure differential between port 26 and tank is below 200 p.s.i., the spool 22 will be moved to the right by spring 25. If the pressure differential tends to exceed 200 p.s.i., spool 22 will be moved to the left against spring 25. At a pressure drop which is very close to 200 p.s.i., the spool 22 will remain centered as shown in FIGURE 1 with its land 28 just closing port 27.

Since port 27 of compenstor valve 23 is the same width as spool land 28, flow cannot pass into or leave the pump control cylinder 5 via line 7 as long as spool 22 remains centered. If the pressure at port 26 becomes excessive, fluid from port 29 and line 30 will be directed through valve 23 to line 7 and will be effective to reduce the output of pump 4. If the pressure at port 26 tends to drop below 200 p.s.i., the spool 22 will move to the right and release fluid from the pump control cylinder 5, which will increase the output from pump 4. Thus, the volumetric output of pump 4 is automatically regulated to provide the flow necessary to maintain 200 p.s.i. across variable orifice 19.

When the valve is in the N position, the only restriction in the path from line 11 to the reservoir 18 is variable orifice 19 and therefore the pressure existing at the pump output port will only be 200 p.s.i. Thus, in this valve setting the volume delivered by the pump will be at a minimum, determined by the size of variable orifice 19. Under these conditions, the circuit is considered to be idling or unloaded and very low horsepower is required from the engine for powering the pump 4.

When the valve 8 is in the N range, motor lines 9 and 10 are blocked by check valves 31 and 32 respectively against fluid being exhausted through the motor 1. However, should an external force such as gravity acting on an off-center load in the drum tend to make the fluid motor creep, either check valve 31 or 32 will open to supply make-up fluid under the 200 p.s.i. pressure to the particular port of the motor 1 which at the moment is acting as the inlet port. This pressure supercharging of checks 31 and 32 assures that the fluid motor 1 cannot lose its prime and thereby "run away" under the influence of an external load.

Since the primary purpose of the hydraulic circuit is to drive the load 3 with fluid motor 1, the description of the system with respect to this function will be undertaken first, leaving the description of the braking function until later. As the valve control arm shown at 33 is swung from the N position through the forward braking range ("BF") to the beginning of the forward or F operating range, hydraulic connections between valve lines 11 and 30 and motor ports 9 and 10, respectively, are established as indicated by the paths designated under F in FIG. 1 in the direction controlling portion 12 of the valve. These connections are effective throughout the full swing of the arm 33 in the F range. The only significant change occurring as the arm 33 is moved within the F range is in the size of variable orifice 19 and, consequently, motor speed. Specifically, when the F range is entered, orifice 19 is at the same minimum size in which it had been in the N range. When the arm 33 is swung to the extreme end of the F range, the orifice 19 is at its maximum size, corresponding to maximum motor speed.

In the F range, the output from pump 4 still enters valve 12 at port 13, but now port 13 is connected directly to motor port 9 and motor port 10 is now connected directly to lines 30, 16 and 20. These connections direct any volume delivered by pump 4 through motor 1 to line 16, variable orifice 19 and drain line 17 to reservoir 18. Under these conditions, motor 1 moves at a rate determined by the output of pump 4. However, pump 4 is caused automatically to seek and maintain a volume which will rotate motor 1 at a speed such that the exhaust from the motor passing through variable orifice 19 will maintain the spool 22 of valve 23 in the center or balanced condition. In other words, the pump delivery is automatically regulated to produce the 200 p.s.i. (or other preselected pressure differential) across orifice 19. Thus, the speed of the motor 1 is responsive to adjustments in the size of orifice 19. Therefore, the fluid motor speed in range F varies from a minimum to a maximum corresponding to the minimum and maximum sizes of the variable orifice 19.

The speed of motor 1 is only briefly and temporarily affected by changes in the shaft speed or pump 4 because the circuit is always hunting for and attempting to maintain the preselected 200 p.s.i. exhaust back pressure and re-establishes the proper flow independently of shaft speed. The motor 1 may be driven at a rate which is greater than that at which the volume of fluid in line 11 would drive it. For example, in range F, should external forces acting on load 3 drive motor 1 faster than the speed corresponding to the setting of orifice 19, some of the fluid from motor 1 is recirculated through the direction valve spool via line 35, check valve 31, and line 36. This recirculating action is independent of the cooperation between pump control cylinder 5 and orifice 19 and therefore such recirculation does not cause the pump 4 to alter its output flow in response thereto.

Figure 3:
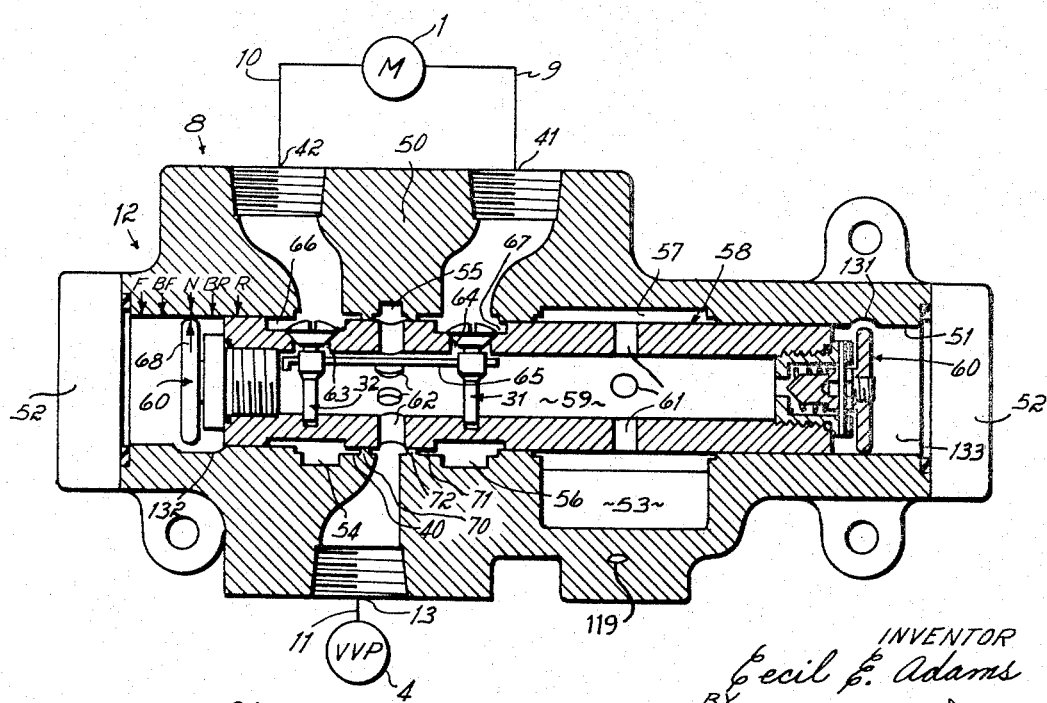
FIGURE 3 is a vertical axial section of the valve shown in FIGURE 2.

Although not shown in FIGURE 1, the valve 8 includes flow control devices, as shown in FIGURES 3 and 9, which positively prevent sudden movement of arm 33. Therefore, sudden changes in the size of orifice 19 are prevented and sudden accelerations or decelerations of the load 3 are prevented.

Between the N and the F ranges is the forward braking or "BF" range. The BF range has a dual function respecting the handling of forces caused by the application of external loads to the fluid motor 1. First, if the control handle 33 is in the F range with the fluid motor 1 driving a heavy inertia load 3 at a fairly fast rate and the operator moves arm 33 toward the N position as fast as the flow control devices permit, the fluid motor 1 should theoretically be stopped at the border line between the F and BF ranges since by that time orifice 19 has been set at its minimum size. However, since the inertia of load 3 may be very large, the load may tend to continue rotating even though power from pump 4 is no longer applied to it. To handle this situation without damage to the system, the internal connections in valve 8 in the BF range apply a gradually varying restriction or orifice 40 in the exhaust path of the motor 1. The exhaust flow from motor 1 enters valve 8 through port 42, passes through variable restriction 40 and through check valve 31, and re-enters the motor via the port 41. This action does not positively block the exhaust from the motor 1, but will rapidly dissipate the inertia of the load 3. Thus, assurance is provided of stopping the load 3 before the motor 1 is finally blocked in the N position.

Throughout the BF range which bridges the F and the N ranges, the pump delivery is largely bypassed to line 30 through internal branch line 14 in the valve spool in the same manner as occurs in the N range. Also, in the BF range the inlet of check valve 31 is exposed to the preselected 200 p.s.i. back pressure which always exists in the exhaust flow circuit. Thus the check valve 31 is supercharged which insures that no cavitation will occur in the motor 1.

A further function of the BF range comes into effect during the transition from the N range to the F range. Specifically, if there is an existing unbalanced rollback load 3 before motor rotation is begun, this unbalanced load will be gradually relieved as the valve arm 33 is moved from the N to the F range. However, rapid movement of the load while relieving this unbalanced load is prevented by the variable restriction 40.

The operation of the system in the reverse, or R, range and the brake reverse, or BR, range is substantially analogous to operation in the F and BF ranges, respectively, and therefore will not be described in detail. It will be appreciated that if the valve is to be used with a fluid motor which is not reversible, the valve can be simplified without departure from the spirit of the invention, simply by omitting these ranges of valve operation and their components.

A relief valve 43 is set to bypass the orifice 19 if the pump control means fails to reduce the pump delivery as rapidly as the size of orifice 19 is reduced during the deceleration phase of operation. The valve 43, therefore, limits the pressure drop across orifice 19 to a low value, e.g., 300 p.s.i., even under abnormal conditions.

To prevent excessive hunting of the spool 22, the land 28 thereof is provided on both sides with extensions 44, 44 which are of slightly reduced diameter. These extensions 44, 44 in conjunction with the edges of port 27 form orifices 45, 45 which allow the land 28 to close port 27 gradually and slowly, thereby preventing hunting.

*Detailed description of the valve*

As shown in FIGURES 2–5, the direction controller 12 and the speed controller 15 of the control valve 8 are preferably an integral unit enclosed within a casing, housing, or body 50.

Figure 5:
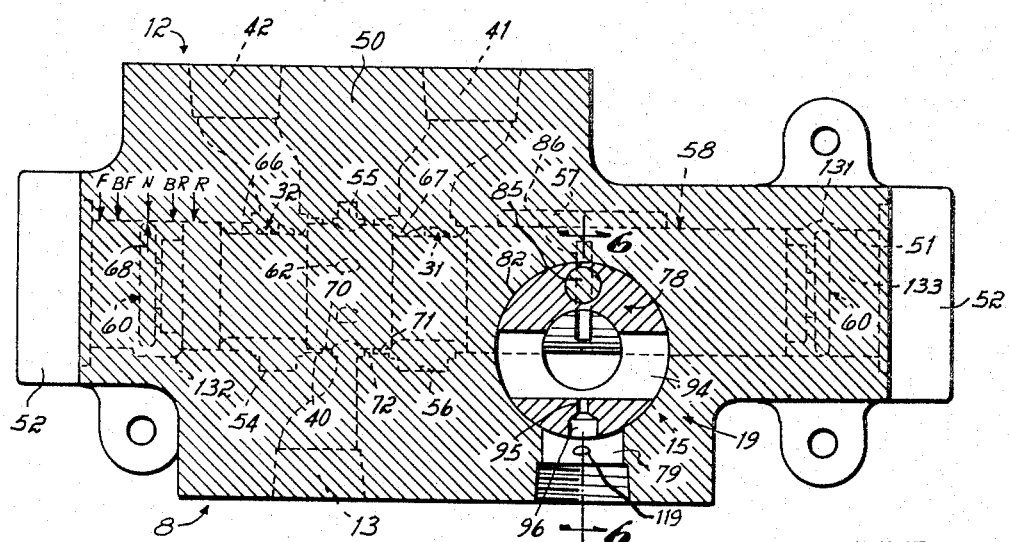
FIGURE 5 is a cross-section taken along lines 5—5 of FIGURE 4 showing the speed controlling spool in the center or neutral position.

The portion of body 50 enclosing direction controller 12 includes a central bore 51 sealed at both ends with caps 52, as shown in FIGURES 3 and 5. The body 50 also includes an inlet port 13 for connection in use to a pump 4 via line 11, a pair of ports 41 and 42 through which fluid can pass to and return from motor 1 through lines 9 and 10, and an outlet chamber 53 through which fluid passes to the speed controller 15 to be subsequently described in detail. It is to be understood that the terms pump and motor are used in their broadest sense and include any apparatus capable of providing a variable flow of pressure fluid and any fluid-operated motive device subject to a load, respectively. Bore 51 has circumferential grooves 54, 55, 56 and 57 which communicate with ports 42, 13, 41 and chamber 53, respectively.

To direct the flow of fluid selectively from inlet port 13 to, alternatively, outlet chamber 53, thereby bypassing motor ports 41 and 42, or to one of the motor ports 41 and 42 for driving motor 1, a spool 58 is provided in bore 51.

The valve spool 58 has a central bore 59 (line 14 in FIG. 1) which is fitted at each end with a flow control device 60, the function, operation, and structure of which are described later. The bore 59 also communicates with outlet chamber 53 in all spool ranges via radial ports 61 in the spool. Spool 58 also has radial holes 62, 63, and 64, all of which communicate with bore 59. The holes 63 and 64 are provided with poppet-type check valves 32 and 31, each loosely retained by a rod 65 and the holes 63 and 64 also communicate with a pair of circumferential grooves 66 and 67, respectively, formed on the exterior surface of the spool 58. With the spool 58 in the centered position as shown in FIGURE 3, grooves and ports 66, 62 and 67 of spool 58 are aligned with grooves and ports 54, 55 and 56, respectively, of valve body 50.

In operation, when spool 58 is in the neutral or center position N (the center of which position corresponds to the alignment of arrow 68 with N in FIG. 3), no motion is imparted to the motor 1. In this position, fluid is pumped into direction controller 12 via inlet port 13 and flows through spool 58 to speed controller 15 via outlet chamber 53. Connecting inlet port 13 and outlet chamber 53 are groove 55, ports 62, bore 59, ports 61, and groove 57. While fluid can pass motor ports 41 or 42 to provide make-up liquid to motor 1 should leakage occur in either or both of the motor lines, no fluid can flow toward spool 58 because those ports are blocked against flow from the motor by check valves 31 and 32, respectively. Hence, no fluid can leave motor 1 and, consequently, no power can be transferred to motor 1 by the flow of fluid therethrough.

With spool 58 in the extreme left-hand range in FIGS. 3 and 5, i.e., range F, fluid enters inlet port 13 and flows around spool 58 via the passageway formed by grooves 67 and 56 into motor port 41, through motor 1 into motor port 42, and finally out of direction controller 12 and into speed controller 15 via groove 54, ports 62, bore 59, ports 61, groove 57 and outlet chamber 53. Should motor 1 tend to override, some of the fluid leaving the motor through motor port 42 will be recycled through the motor via check valve 31.

Similarly, with spool 58 in its extreme right-hand range, i.e., range R, the fluid enters inlet port 13 and flows around spool 58 via the passageway formed by grooves 66 and 54, into motor port 42, through the motor 1, into motor port 41, and finally out of direction controller 12 and into speed controller 15 via the groove 56, ports 62, bore 59, ports 61, groove 57 and outlet chamber 53. Some fluid will also flow from groove 56 through groove 67 in the spool and into groove 57. Should the motor 1 tend to override, some of the fluid leaving the motor via port 41 will be recycled through the motor via check valve 32.

Thus, with spool 58 in either of the extreme ranges F or R, there is an unrestricted flow path from pump 4 to motor 1 and thence to speed controller 15, the flow to and from the motor being through direction controller 12.

With spool 58 in either of the intermediate ranges, i.e., in either of the braking ranges BF or BR, there is no longer an unrestricted flow path between pump 4 and speed controller 15. Instead, a flow restricting orifice is interposed in the motor outlet path between motor 1 and speed controller 15 which tends to decelerate the motor. Specifically, if spool 58 is in the forward braking range BF, there is an orifice 40 formed by a land 70 and the ports 62; in the reverse braking range BR, there is an orifice at 71 formed by a land 72 and ports 62. Thus, in the forward braking range BF, there is a path from inlet port 13 to outlet chamber 53 when decelerating via groove 55, ports 62, bore 59, check valve 31, motor port 41, motor 1, motor port 42, grooves 54 and 66, orifice 40, ports 62, bore 59 and ports 61. There is also a path from inlet port 13 to the outlet chamber 53 via ports 62, bore 59, and ports 61. With the spool 58 in the reverse braking range BR, there is a path from the inlet port 13 to outlet chamber 53 via groove 55, ports 62, bore 59, check valve 32, motor port 42, motor 1, motor port 41, grooves 56 and 67, orifice 71, ports 62, bore 59 and ports 61. As with the reverse braking range BF, there is also a path from the inlet port 13 to the outlet chamber via ports 62, bore 59, and ports 61.

Figure 4:
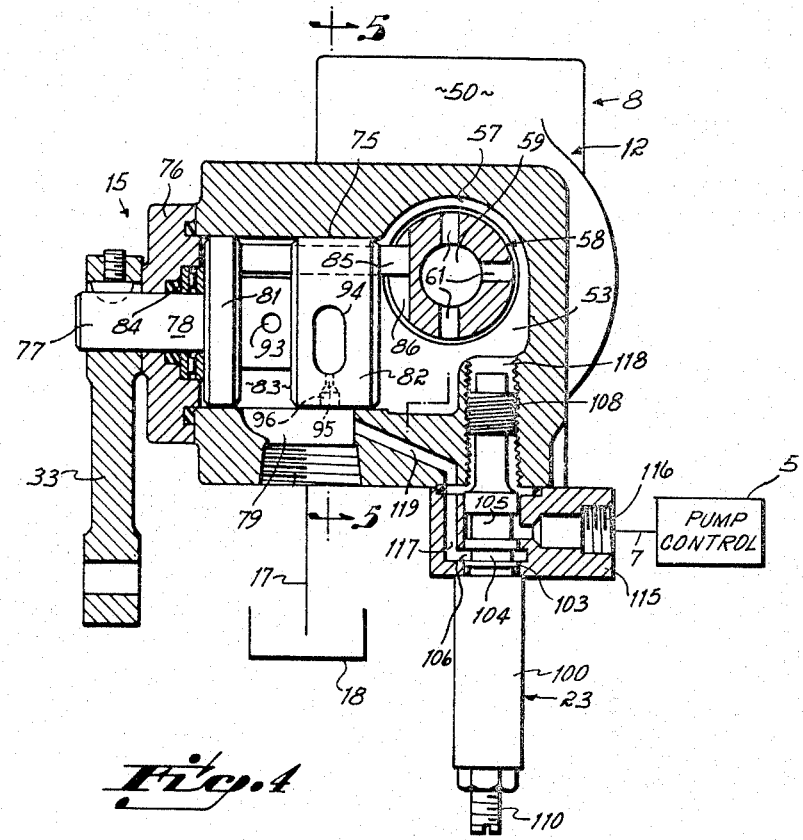
FIGURE 4 is a transverse cross-section taken along lines 4—4 of FIGURE 2.

As shown in FIGS. 4–6, the portion of valve body 50 enclosing speed controller 15 includes a bore 75. The bore 75, which extends at substantially right angles to bore 51 of direction controller 12, is offset therefrom. At one end bore 75 communicates at all times with outlet chamber 53 of direction controller 12, and at the other end the bore is sealed by an end cap 76 and a reduced diameter end portion 77 of spool 78. Also communicating with the bore 75 is an outlet port 79 which in use is connected to fluid reservoir 18 by a line 17.

The spool 78 has spaced lands 81 and 82 separated by a groove 83 and is rotatable in bore 75. The spool 78, which has the control arm 33 fixed to the reduced diameter portion 77 thereof, rests against a thrust bearing 84. The spool 78 also contains a pin 85 eccentrically mounted in lands 81 and 82. The right end of this pin 85 engages a slot 86 in direction controller spool 58. In a manner to be described later, pin 85 coordinates the motion of speed and direction controller spools 78 and 58, respectively, permitting control arm 33 to control both speed and direction.

With reference now to FIGURES 5 and 6, spool 78 includes a stepped central bore 87 including a large diameter portion 88 contained within land portion 82 thereof and a small diameter portion 89 leading from portion 88. The portion 89 of this bore contains a pressure relief valve 43 including a ball 90 urged against a seat 91 by a spring 92. When the relief valve 43 opens, it permits fluid to flow from portion 88 to portion 89 of bore 87, and thence from portion 89 through a cross bore 93 to groove 83, which is in constant communication with port 79.

The rotary spool 78 also includes a cross passage 94 which extends through land portion 82 and opens to large diameter portion 88 of bore 87 as shown in FIGURES 5 and 6. A fixed orifice 95 having an enlarged outlet 96 is formed in spool land 82 and this orifice connects with large diameter end 88 of bore 87 and chamber 53 in valve body 50. The cross passage 94 and port 79 cooperate to form a variable orifice 98 (see FIGURE 10). The fixed orifice 95 and the variable orifice 98 in combination form the flow metering means 19.

In operation, the speed of motor 1 is controlled by the rate of flow of fluid through the motor. The flow rate in turn is ordinarily controlled by the net orifice area of variable flow metering means 19, providing the pressure differential across variable flow metering means 19 is held constant. To hold the pressure differential across variable flow metering means 19 constant, thereby permitting motor speed to be controlled by varying the net orifice area, a pressure responsive compensator spool valve 23 is provided, as shown in FIGURES 1, 7 and 8.

The valve 23 includes a tubular body 100, the axial bore of which is stepped to provide a vale cylinder 101 and an abutment 102. The outside of the body 100 has a ground cylindrical portion 103 in which there are two circumferential grooves 104 and 105. Radial ports 106 and 27 lead from grooves 104 and 105, respectively, to valve cylinder 101. The body 100 also includes a threaded end portion 108. The valve cylinder 101 contains valve spool 22, which includes a pair of lands 24 and 28 separated by a groove 112. The spool 22 also presents a boss 21 which engages bore abutment 102 to arrest the movement of the spool 22 when it is urged upwardly by a compression spring 25 abutting one end of valve spool 22. An adjusting screw 110, which is threaded into the end of the body 100 and secured in its adjusted position by a lock nut, is provided to permit adjustments in the force exerted by spring 25 on spool 22. The valve spool 22 further includes an axial bore 113 which intersects a cross bore 114 in the groove 112. Valve cylinder 101 below the spool 22 is vented to tank 18 by passages 113 and 114, the path being via passages 117 and 119, and port 79 (see FIGURES 4 and 7). Since radial port 114 is always in communication with groove 112 in spool 22, the venting is continuous regardless of spool position.

The valve 23 has its cylindrical portion 103 fitted through a bore in a fitting 115. The fitting 115 is provided with the passages 116 and 117 which communicate with grooves 105 and 104, respectively. The passage 116 connects in use to the pump volume control cylinder 5, which, as previously noted, may be of the type comprising a pressure operated, spring-opposed piston 6 acting on the hanger of a variable volume pump. The fitting 115 is appropriately sealed and clamped to the body, casing or housing 50 by the valve body 100, which has its threaded portion 108 screwed into a threaded bore 118. The bore opens into the chamber 53 in the body 50 so that the end 21 of the spool 22 is exposed to the high pressure side of the variable flow filtering means 19 at all times.

In operation, the spool valve 23, by varying from the equilibrium position of FIGURE 7, maintains the pressure differential across the variable flow metering means 19 constant, thereby permitting the net orifice area of the speed controller 15, as determined by the arm position 33, to vary the flow rate and motor speed. The preferred pressure differential is 200 p.s.i., as previously noted.

Specifically, when the control valve 8 has come to equilibrium at any given flow rate and, hence, at any given motor speed, the pressure upstream of the variable flow metering means 19 is communicated to the spool 22 via passage 118 and port 26 and holds the spool 22 in the position shown in FIGURE 7. In this position, land 28 of spool 22 blocks port 27, preventing flow to or from pump control cylinder 5. Thus, fluid flows neither toward nor away from the pump volume control cylinder 5, and hence, pump output and motor speed are constant.

However, should the net orifice area of variable flow metering means 19 be reduced to reduce motor speed, the pressure ahead of the orifice increases and is communicated to passage 118 and port 26, thereby depressing spool 22 and adding fluid to pump volume control cylinder 5 via port 27. In response to the added fluid, pump 4 reduces the flow rate, reducing the upstream pressure, thereby restoring equilibrium at the lower flow rate and, hence, stabilizing motor speed at the reduced rate.

Should the net orifice area of speed controller 15 be increased to increase flow rate and motor speed, the upstream pressure in passage 118 drops, permitting spool 22 to rise. As spool 22 rises, fluid from pump volume control cylinder 5 flows to reservoir 18 via port 27, groove 112, passage 119 and port 79. Pump volume is thereby increased, increasing the upstream pressure and restoring spool 22 to the equilibrium position, thereby maintaining the flow at the increased rate, determined by the new, larger net orifice area of variable flow metering means 19.

As shown in detail in FIGURE 8, the land 28 of spool 22 is provided with reduced diameter extensions 44, 44. These extensions 44 have a preferred width on the order of .010 inch and a preferred diameter approximately .005 inch less than the diameter of the land 28. The extensions 44, in combination with the edges of port 27, form orifices 45, 45 which serve to allow the land 28 to seal port 27 gradually and slowly. In operation, as the land 28 moves in sealing relation with port 27, the flow through the port 106, due to the gradual introduction of an orifice 45, slowly tapers off to zero. This tapering off of flow through the port 27 tends to gradually reduce the velocity of piston 6 to zero as the land 28 approaches sealing relation with the port 27, preventing hunting which might otherwise be experienced.

To prevent pressure surges which might be caused by suddenly subjecting the motor to a large accelerating force in either the reverse or forward direction, flow control devices 60, 60 are fixed to each end of the direction spool 58, as shown in FIGURE 3, which limit the speed at which arm 33 can be moved to or from the N range toward either of the extreme ranges F or R. As shown enlarged in FIGURE 9, flow control device 60 includes an element 120 in the form of an integrally formed disk 121 and needle valve element 122. The needle valve 122 extends axially from disk 121 into the hollow center of a hat shaped body 123 and has a conical end 124 which cooperates with a valve seat 125 formed in the end wall of the body 123. The body 123 is threaded into the end of spool 58 and sealed thereto by an O-ring. The element 120 includes a central axial bore or recess 126 into which a restrictor or orifice-forming plug 127 is threaded. The valve element 122 is also provided with openings 128 through which a retaining pin 129 extends with a loose fit in order that the element 120 may be moved to compress a spring 130 in the hollow center of the body 123, thereby causing the conical valve element 124 to restrict the valve seat 125. The ends of pin 129 are rigidly carried in body 123. The diameter of disk 121 is such that it has a sealing, sliding fit with bore 51. The bore 51 is provided with a dimple or flow passage 131 at the right end of spool 58, and with a slot 132 (FIGS. 3 and 5) at the left end of the spool 58. The dimple and slot function to render either speed controller 60, 60 inoperative as its respective disk 121 moves across them.

It is essential to control the rate of travel of the spool 58 so as to prevent shocks to the system. For this purpose, the flow control devices 60 are provided. In operation, when spool 58 is moved or shifted from the N range, for example, very slowly toward the right, the right-hand flow control device 60 is only slightly restrictive of its movement. Specifically, the hydraulic fluid trapped in the right-hand end chamber 133 of the bore 51 is forced so slowly through the restrictor 127 and into the bore 59 that the pressure differential created on the opposite sides of the disk 121 is insufficient to cause the disk 121 to move the needle 124 toward the seat 125 and thus, under this condition, the right-hand flow control device 60 operates in the nature of a simple dashpot. During this time, the left-hand end chamber 133 will be filled, through its orifice 127, with fluid at the 200 pound pressure maintained in bore 59.

When a higher force is applied to the spool 58 of the valve and spool 58 starts to move to the right, fluid in the chamber at the right-hand end of the bore 51 is discharged through orifice 127, past the needle and through the seat in the spool. This discharge flow creates a pressure drop through orifice 127 and tends to move device 120 against the force of spring 130 and restricts the seat opening. The spool movement is thus restricted in speed and can only move at a rate wherein the pressure drop through orifice 127 balances the force of the spring 130.

The preferred pressure compensated flow controllers 60 herein described function to establish a maximum rate of shifting speed which is when the pressure differential across the orifice 127 is such that the needle 124 is about to restrict the seat 125 and this maximum speed is such that pressure peaks and shocks resulting therefrom cannot occur in the system. It will thus be seen that when the above described maximum speed of shifting of the spool 58 has been attained that increased shifting force on the spool 58 will not result in an increase in shifting speed but, to the contrary, would result in a slower shifting speed.

The latter action above described is obtained by the slightly hydraulically unbalanced construction of the device 120. The right-hand side or high pressure side of disk 121 of device 120 has the high pressure exposed to its full area but the left-hand side of the disk 121 is exposed to the full area minus the area of the seat 125. This results in a hydraulic unbalance force which acts in opposition to and tends to reduce the effective force of spring 130.

Thus with a high shifting force applied to the spool 58, a lesser flow through orifice 127 will balance the device 120 against the spring 130 than with a low force applied to the spool and the actual rate of shifting of the spool 58 will reduce as the force applied to the spool 58 is increased.

From the foregoing, it will be seen that the valve structure herein described is paradoxical in that it can be shifted more rapidly when the shifting forces applied to it are such that the device 120 is at the point of beginning to restrict the seat 125 and that, after this point is reached, an increased shifting force actually results in a reduced shifting speed. It is pointed out that the structure of each of the compensated flow control devices 60 as placed in the spool bore 51 results in a fail safe device, i.e., should the spring 130 fail or should the disk 121 seize in bore 51 for any reason, motion of the spool toward the needle 124 will result in closing of the seat 125 to prevent further movement of the spool. It is also to be noted that positive filling of the opposite chambers with liquid is assured since the fluid entering them from the bore 59 is always at a pressure of 200 p.s.i.

It is because of the presence of the pressure compensated flow control devices 60 and their functions that a hydraulic system including the valve 8 need not include relief valves and the like, the sole purpose of which is to relieve pressure peak shocks in the system due, for example, to rapid shifting of the valve and which makes it feasible to provide a control valve having a single operating lever movable in a single plane to shift the valve through all of its ranges without interruption. It is desirable, among other reasons, to have all functions of the valve 8 controlled by a single lever movable in a single plane since this type of lever will very readily allow the use of one or more remotely located controlling devices to be connected to operate the lever.

In an analogous manner, the operation described above obtains when spool 58 is shifted to the left.

Slot 132, which is present only in the left-hand end of the bore 51, functions to permit the spool to be moved rapidly from the lower extremity only of the R range through the BR range and into the N position, thereby permitting slow reverse motor motion to be arrested quickly. Such action is desirable in a concrete mixer since it permits a sharp cutoff of concrete being discharged from the mixer. This function is particularly desirable to provide a sharply defined cut-off to prevent the over-filling of small containers which are receiving the concrete being discharged. In the embodiment shown, there is no corresponding groove on the right end of bore 51 so that forward motor operation can be slowed only gradually to a full stop. A dimple similar to dimple 131 may be substituted for the slot 132 when the function of the slot is not needed.

*Operation*

It should be understood that the control valve of this invention, although described with respect to its use in controlling the speed and direction of rotation of a mixer drum 3 on a transit-type concrete mixer truck, is not limited to this use alone. On the contrary, the valve of this invention has utility in all applications where it is desired to control the direction and volumetric rate of flow of a fluid through a hydraulic motor.

In describing the manner in which control valve 8 of this invention functions to control the speed and direction of rotation of mixing drum 3, it will be assumed that the drum is initially at rest, that the truck motor is not driving the pump 4, and that the valve control arm 33 is in neutral. With the hydraulic system in this condition drum 3 is hydraulically blocked in position. The check valves 31 and 32, which prevent fluid from leaving motor 1 via motor ports 41 and 42, resist rotation of motor 1 in either direction. This blocking of the motor ports 41 and 42 tends to arrest the motion of the motor and, hence, drum 3 in whatever position it is in when direction spool 58 is centered by placing arm 33 in neutral. Of course, if the drum 3 is stopped in a position wherein the drum load is off-center, the drum will gradually rotate, centering the load due to internal leakage of fluid from one motor line to the other. The supercharged check valves 31 and 32 serve to insure that fluid lost through such leakage is replaced.

To drive the motor 1 in the forward direction, it is first necessary to cause the truck engine to drive the pump 4. With the pump driven, fluid flows from pump outlet line 11 to inlet port 13 of direction controller 12, and thence to speed controller 15 via outlet chamber 53 (shown as line 30 of FIG. 1) of direction controller 12. With arm 33 of control valve 8 in neutral, only the fixed orifice 95 of the variable flow metering means 19 passes fluid, as shown in FIGURE 5. Under these circumstances, the cross-passage 94 of the variable orifice 98 does not communicate with port 79. The pressure upstream of the variable flow metering means 19 is maintained at the preferred equilibrium magnitude of 200 p.s.i. by the pressure responsive compensator spool valve 23 in the manner described previously. Pump 4 supplies just enough output flow to keep the upstream pressure at the equilibrium value of 200 p.s.i.

With the truck engine driving pump 4, the control arm 33 is turned counterclockwise (FIGURE 2) to initiate rotation in the forward direction. As arm 33 is rotated through the forward braking range BF, the spool 78 is rotated counterclockwise from the position depicted in FIGURE 5 to that in FIGURE 10, ultimately gradually sealing off fixed orifice 95. Until the variable orifice 98 opens, the net orifice area does not change substantially and there is substantially no change in upstream pressure. Hence, there is substantially no change in the amount of fluid in control cylinder 5. Thus, the pump output remains substantially constant as the control arm 33 and speed spool 78 rotate from the N through the BF range, depicted in FIGURES 5 and 10, respectively.

As the control arm 33 rotates from the N range to the BF range, rotating spool 78 to the position shown in FIGURE 10, pin 85 slides or cams spool 58 to the left. During the course of this sliding action, check valve 32 is gradually shunted by orifice 40. Thus, in the BF range, a fluid patch exists from motor 1 via port 42, groove 67, orifice 40 and radial holes 62 to central bore 59 of spool 58. While there is a path to the motor from bore 59 through check valve 31 and port 41 no hydraulic power is imparted to motor 1 or drum 3 because both motor ports 41 and 42 are connected to the bore 59 in spool 58; however, an external load on the drum 3 can rotate it in the forward direction with the exhaust from motor 1 being forced through the orifice 40. Rotation of the drum 3 in the opposite or reverse direction is provided by the check valve 31.

Further counterclockwise rotation of control arm 33 after the spool 58 begins to enter the F range, in which the motor begins to be driven, produces further rotation of spool 78, and the effective area of the variable orifice 98 increases. As the size of orifice 98 increases, the upstream pressure tends to drop inasmuch as the flow rate through the orifice 98 is momentarily still the same. This decrease in upstream pressure is communicated to the port 26 of pressure responsive compensator spool valve 23, causing the spool 22 to be moved against spring 25 (see FIGURES 1 and 7). As spool 22 moves, fluid from the control cylinder 5 flows through port 27, groove 112, port 106, passages 117 and 119, and port 79 to fluid reservoir 18. The loss of fluid from control cylinder 5 increases the pump output, raising the upstream pressure. When the equilibrium upstream pressure of 200 p.s.i. is reached, spool 22 seals off port 27 thereby maintaining the pump output and, hence, the motor and drum speeds at the level established by the orifice area of the variable orifice 98.

As will be apparent to those skilled in the art, the net orifice area of the variable orifice 98 has an infinite number of magnitudes throughout the F range. Therefore, there are an infinite number of possible flow rates between the minimum and maximum rates, giving rise to an infinite number of motor and drum speeds within the F range.

Concurrently with the increase in net orifice area of variable flow metering means 19, achieved by further rotation of arm 33 into the F range, pin 85 slides spool 58 further to the left (FIGURE 3). This additional sliding of spool 58 bypasses orifice 40, in effect removing it from motor outlet line 42. The fluid is now free to pass from motor 1 to direction controller 12 through an unobstructed path.

Figure 2:
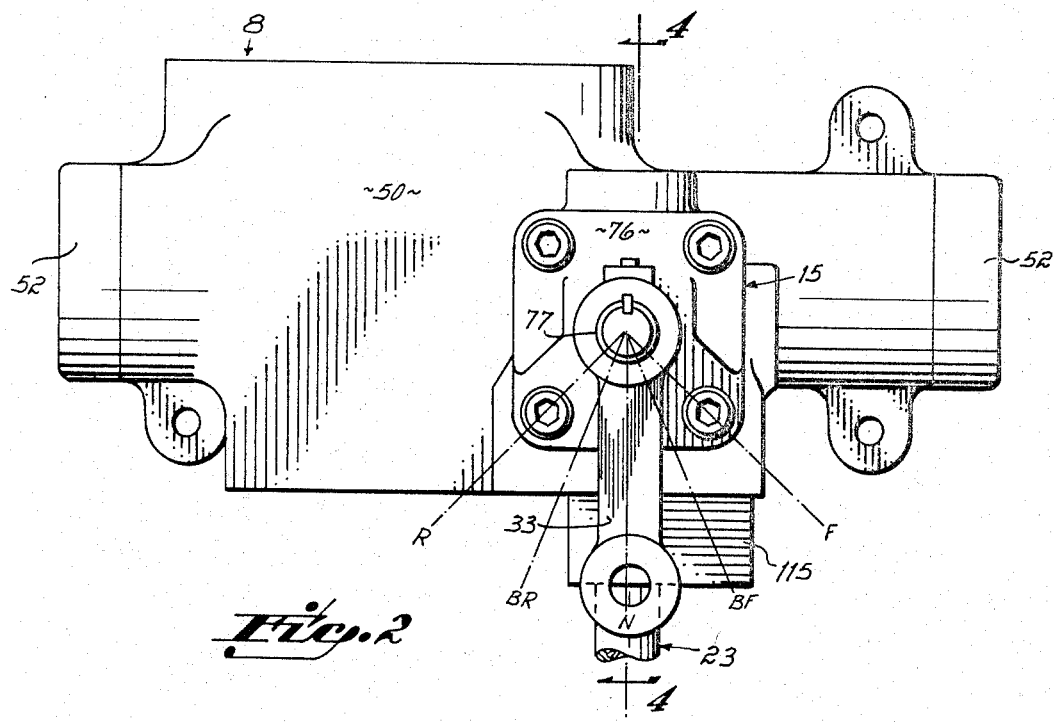
FIGURE 2 is a front elevation of a preferred valve means which includes the features of this invention.

To stop motor 1 and drum 3, arm 33 is rotated clockwise, as seen in FIG. 2, from the F range through the BF range to neutral. As the arm 33 is rotated, in the F range toward the BF range the net orifice area of variable flow metering means 19 is reduced, raising the upstream pressure since the flow rate through metering means 19 is as yet unchanged, thereby shifting spool 22 to the left in FIGURE 1 and admitting fluid to control cylinder 5 via chamber ports 26 and 27 and line 7. The fluid admitted to control cylinder 5 reduces the pump output, reestablishing the equilibrium upstream pressure at the reduced flow rate.

As arm 33 passes through the BF range, orifice 40 becomes positioned in motor outlet line 42, and progressively resistricts the outlet line 42 thereby braking motor 1 and drum 3. Further rotation of arm 33, into the N range, blocks the motor outlet port due to the interposition of check valve 32 in the motor exhaust line 42.

Driving motor 1 and drum 3 in the reverse direction is produced in an analogous manner by rotating arm 33 clockwise from the N range through the BR range into the R range. Stopping motor 1 and drum 3 is accomplished by returning arm 33 to the N range through the BR range. Since the speed and direction spools 78 and 58 are symmetrical about the N range, with the exception of slot 132, rotating arm 33 a specified amount in either direction from the N range produces identical results except that the direction of flow through the motor 1 is reversed.

Should the truck engine at any time speed up causing a momentary increase in fluid pumped by pump 4, the flow through the variable flow metering means 19 will suddenly increase, raising the upstream pressure above the equilibrium pressure of 200 p.s.i. The increased upstream pressure will in turn shift spool 22 admitting fluid to control cylinder 5, thereby decreasing the pump output and returning the upstream pressure to the equilibrium point. When the equilibrium upstream pressure is reached, spool 22 again seals port 27, preventing flow to or from control cylinder 5.

In an analogous manner, a sudden drop in truck engine speed, giving rise to a momentary drop in flow rate and upstream back pressure, will result in the removal of fluid from control cylinder 5, thereby increasing the flow rate to a point where the equilibrium upstream pressure is restored. Thus, the control valve 8 automatically maintains the volumetric flow rate and, hence, the motor 1 and drum 3 speed at a constant value, notwithstanding erratic, unpredictable changes in the speed at which the truck engine drives the pump 4.

Relief valve 43, shunting variable flow metering means 19 prevents excessive back pressures from building up when drum 3 decelerates by by-passing some of the fluid leaving motor 1 from direction controller 12 directly to fluid reservoir 18. When arm 33 is rotated toward the N range from either the R or F range, the net orifice area of the variable flow metering means 19 is decreased. At the same time, the volumetric flow of fluid leaving motor 1 unchanged due to the inertia of drum 3 which tends to keep the drum rotating at the same speed, thereby driving fluid from motor 1 at the same rate. Inevitably, the upstream pressure momentarily must rise considerably. To avoid damage to the hydraulic system due to unduly high pressure increases, relief valve 43, set at approximately 300 p.s.i., shunts some of the fluid leaving motor 1 past metering means 19. Since the setting of relief valve 43 is approximately 100 p.s.i. above the pressure required to actuate spool valve 23, this shunting of fluid does not prevent the increased upstream pressure prevailing during deceleration from actuating spool valve 23 to thereby decrease the flow rates in response to the reduced orifice area of variable flow metering means 19.

While the preceding description has spoken in terms of shifting arm 33 and associated direction and speed spools 58 and 78 from one range to another, as from the N range to the F range, it should be understood that the term "range" has been used in a rather generals sense. That is, while the spool 58 is nominally a five range spool, there are in fact no abrupt changes in operation of the hydraulic system as spool 58 moves within bore 51. On the contrary, movement of the spool 58 from, for example, the F range to the BF range involves the gradual introduction of orifice 40 into motor outlet line 42. Stated differently, as arm 33 is rotated from the F range to the BF range, orifice 40 does not suddenly become connected into the motor outlet line 42. This operational feature assures smooth acceleration and deceleration.

As will be understood by those skilled in the art, numerous variations in the details of the preferred embodiment may be made without departing from the scope of this invention. For example, the relative positions of the direction controller 12 and speed controller 15 of the valve 8 may be interchanged. Specifically, the valve 8 may be modified so that, when driving the motor, fluid from the pump enters the speed controller 15 prior to entering the direction controller 12 and motor 1. When such a modification is made, the direction controller 12 exhausts to the fluid reservoir 18 rather than to the speed controller 12 as in the preferred embodiment; and the pump 4 connects to the speed controller 15 rather than to the direction controller 12. In either case, the direction controller 12 and speed controller 15 communicate with each other.

For reasons which are readily obvious to those skilled in the art, important advantages of the valve means herein described reside in its compactness and, as graphically illustrated in FIG. 1, in the fact that with the exception of the pressure source, namely the pump 4, the reservoir 18 and the motor 1 that the entire hydraulic circuit is contained within the confines of the control valve 8, thus minimizing number of fluid lines and connections necessary in the complete circuit including the pump, valve and motor and thereby reducing the hazards attendant such lines and connections particularly in mobile applications of the system.

Having described my invention, I claim:

1. A valve for controlling the direction and volumetric rate of flow of fluid through a hydraulic motor from a pressure source of the type having hydraulically operated means for adjusting its volumetric output, said valve comprising:

a valve body;

a direction chamber formed in said valve body;

an inlet port, an outlet chamber and a pair of motor ports formed in said valve body and communicating with said direction chamber;

movable direction controlling means positioned in said direction chamber for selectively interconnecting either of said motor ports to said inlet port and the other of said motor ports to said outlet chamber whereby the direction of fluid flow through said motor is selectively reversible;

a flow rate chamber formed in said valve body and in series with the fluid operating said motor;

adjustable flow rate controlling means positioned in said flow rate chamber for selectively restricting the flow path of the fluid operating said motor;

means for hydraulically connecting said flow rate controlling means to said pressure source adjusting means, said connecting means being responsive to a pressure differential across the flow rate controlling means for causing adjustment of the volumetric output of said pressure source to maintain said pressure differential constant; and means within said body mechanically interconnecting said direction controlling means and said flow rate controlling means for coordinating control of the direction of flow through said motor and the volumetric rate of said flow.

2. A valve for controlling the direction and volumetric rate of flow of fluid from an adjustable volume pressure source through a hydraulic motor, said valve comprising:

a valve body;

a direction chamber formed in said valve body;

an inlet port, an outlet chamber and a pair of motor ports formed in said valve body and communicating with said direction chamber, movable direction controlling means positioned in said direction chamber for selectively interconnecting either of said motor ports to said inlet port and the other of said motor ports to said outlet chamber thereby transmitting motive power to said motor to drive it in one of two opposite directions, said direction controlling means also being selectively operable to interconnect said inlet port with said outlet chamber to stop the transmission of motive power to said motor;

a flow rate chamber formed in said valve body and communicating with said outlet chamber;

an exhaust port in said valve body, said outlet chamber communicating through said flow rate chamber with said exhaust port;

adjustably movable flow rate controlling means positioned in said flow rate chamber for selectively restricting the flow path between said outlet chamber and said exhaust port;

pressure compensator means responsive to the pressure differential across said flow rate controlling means for adjusting the output volume of said pressure source for maintaining said pressure differential across said flow rate controlling means constant; and means mechanically interconnecting said direction controlling means and said flow rate means for coordinating the control of the direction and volumetric rate of flow of fluid through said motor, said direction controlling means and flow rate means being so interconnected that the restriction of said flow rate controlling means and said rate of flow is a minimum when said inlet port is interconnected with said outlet chamber and is adjustable toward a maximum after the said inlet port is interconnected with either of said motor ports.

3. A valve for controlling the direction and volumetric rate of flow of fluid from an adjustable volume pressure source through a hydraulic motor, said valve comprising:

a valve body;

a direction bore formed in said valve body;

an outlet chamber, an inlet port, and a pair of motor ports formed in said valve body and communicating with said direction bore;

a direction controlling slidable spool positionable axially in said direction bore for selectively interconnecting either of said motor ports to said inlet port and the other of said motor ports to said outlet chamber for transmitting motive power to said motor to drive it in one of two opposite directions, said direction controlling spool being selectively operable to interconnect said inlet port with said outlet chamber and to block the flow of fluid from both said motor ports to said inlet port and said outlet chamber;

a flow rate bore formed in said valve body and communicating with said outlet chamber;

an exhaust port in said valve body communicating through said flow rate bore with said outlet chamber;

a movable flow rate controlling element in said flow rate bore having a passageway communicating with said outlet chamber at one end thereof and cooperating with said exhaust port to form a variable orifice at the other end thereof for selectively restricting the flow path between said oulet chamber and said exhaust port;

pressure regulating means responsive to the pressure differential across said variable orifice for adjusting the output volume of said pressure source for maintaining said pressure differential constant; and means mechanically interconnecting said direction controlling valve and said flow rate controlling element for minimizing the area of said variable orifice when said inlet port is interconnected directly with said outlet chamber and maximizing said area when said inlet port is interconnected with either of said motor ports, thereby coordinating simultaneous control of the direction and volumetric rate of flow of fluid through said motor.

4. A valve for controlling the direction and volumetric rate of flow of fluid from an adjustable volume pressure source through a hydraulic motor, said valve comprising:

a valve body;

a direction bore formed in said valve body;

an outlet chamber, an inlet port, and a pair of motor ports formed in said valve body and communicating with said direction bore;

a direction controlling slidable spool positionable axially in said direction bore for selectively interconnecting either of said motor ports to said inlet port and the other of said motor ports to said outlet chamber thereby transmitting motive power to said motor to drive it in one of two opposite directions, said direction controlling spool being selectively operable to interconnect said inlet port directly with said outlet chamber thereby transmitting no motive power to said motor;

a pair of check valves carried by said spool for interconnecting said pressure port and the respective motor ports to hydraulically lock said motor ports and to supply make-up fluid to said motor ports when said spool is positioned to interconnect said inlet port and said outlet chamber;

a flow rate bore formed in said valve body and communicating with said outlet chamber;

an exhaust port in said valve body communicating with said flow rate bore;

a movable flow rate controlling element in said flow rate bore having a passageway communicating with said outlet chamber at one end thereof and cooperating with said exhaust port to form a variable orifice at the other end thereof for selectively restricting the flow path between said outlet chamber and said exhaust port;

pressure compensator means responsive to the pressure differential across said variable orifice for adjusting the output volume of said pressure source for maintaining said pressure differential constant; and means mechanically interconnecting said direction controlling spool and said flow rate controlling element for minimizing the area of said variable orifice when said inlet port is interconnected directly with said outlet chamber and maximizing said area when said inlet port is interconnected with either of said motor ports, thereby coordinating simultaneous control of the direction and volumetric rate of flow of fluid through said motor.

5. A valve for controlling the direction and volumetric rate of flow of a fluid from an adjustable volume pressure source through a hydraulic motor, said valve comprising:

a valve body;

a direction bore formed in said valve body;

an outlet chamber, an inlet port, and a pair of motor ports formed in said valve body and communicating with said direction bore;

a direction controlling slidable spood positionable axially in said direction bore in either of two extreme positions for interconnecting either of said motor ports to said inlet port and the other of said motor ports to said outlet chamber for driving said motor in opposite directions, respectively, said spool being further positionable in said direction bore to a central position intermediate said extreme positions for interconnecting said inlet port and said outlet chamber thereby transmitting no motive power to said motor;

means carried by said spool for forming and interconnecting an orifice between said other motor port and said outlet chamber as said spool slides between said central and either of said extreme positions thereby braking said motor as said spool slides toward said central position from either of said extreme positions;

a flow rate bore formed in said valve body and communicating with said outlet chamber;

an exhaust port in said valve body communicating with said flow rate bore;

a movable flow rate controlling element in said flow rate bore having a passageway communicating with said outlet chamber at one end thereof and cooperating with said exhaust port to form a variable orifice at the other end thereof for selectively restricting the flow path between said outlet chamber and said exhaust port;

pressure compensator means responsive to the pressure differential across said variable orifice for adjusting the output volume of said pressure source for maintaining said pressure differential constant; and means mechanically interconnecting said direction controlling spool and said flow rate controlling element for minimizing the area of said variable orifice when said direction controlling spool is in said central position and maximizing said area when said direction controlling spool valve is in either of said extreme positions thereby coordinating simultaneous control of the direction and volumetric rate of flow of fluid through said motor.

6. A valve for controlling the direction and volumetric rate of flow of fluid from an adjustable volume pressure source through a hydraulic motor, said valve comprising:

a valve body;

a direction bore formed in said valve body;

an outlet chamber, an inlet port, and a pair of motor ports formed in said valve body and communicating with said direction bore;

a direction controlling slidable spool positionable axially in said direction bore for selectively interconnecting either of said motor ports to said inlet port and the other of said motor ports to said outlet chamber thereby transmitting power to said motor to drive it in one of two opposite directions, said direction controlling spool being selectively operable to interconnect said inlet port and said outlet chamber thereby transmitting no motive power to said motor;

a flow rate bore formed in said valve body and communicating with said outlet chamber;

an exhaust port in said valve body communicating with said flow rate bore;

a movable flow rate controlling element in said flow rate bore having a passageway communicating with said outlet chamber at one end thereof and cooperating with said exhaust port to form a variable orifice at the other end thereof for selectively restricting the flow path between said outlet chamber and said exhaust port;

means connected to said spool for limiting the rate of movement of said spool and movable element whereby rapid accelerations, decelerations and direction reversals of said motor are prevented;

pressure compensating means responsive to the pressure differential across said variable orifice adjustable output volume of said pressure source for maintaining said pressure differential constant; and means mechanically interconnecting said direction controlling valve and said flow rate controlling element for minimizing the area of said variable orifice when said inlet port is interconnected with said outlet chamber and maximizing said area when said inlet port is interconnected with either of said motor ports, thereby coordinating the simultaneous control of the direction and volumetric rate of flow of fluid through said motor.

7. A valve for controlling the direction and volumetric rate of flow of fluid from an adjustable volume pressure source through a hydraulic motor, said valve comprising:

a valve body;

a direction bore formed in said valve body;

an outlet chamber, an inlet port, and a pair of motor ports formed in said valve body and communicating with said direction bore;

a pair of check valves carried by said spool for interconnecting said inlet port and said motor ports to hydraulically block said motor ports and to supply make-up fluid to said motor ports when said spool is positioned to interconnect said inlet port and said outlet chamber;

a flow rate bore formed in said valve body and communicating with said outlet chamber:

an exhaust port in said valve body communicating with said flow rate bore;

a movable flow rate controlling element in said flow rate bore having a passageway communicating with said outlet chamber at one end thereof and cooperating with said exhaust port to form a variable orifice at the other end thereof for selectively restricting the flow path between said outlet chamber and said exhaust port;

means connected to said spool for limiting the rate of movement of said spool and flow rate controlling element thereby preventing rapid accelerations, decelerations and direction reversals of said motor;

pressure compensating means responsive to the pressure differential across said variable orifice adjusting the output volume of said pressure source for maintaining said pressure differential constant; and means mechanically interconnecting said direction controlling valve and said flow rate controlling element for minimizing the area of said variable orifice when said inlet port is interconnected with said outlet chamber and maximizing said area when said inlet port is interconnected with either of said motor ports, thereby coordinating the simultaneous control of the direction and volumetric rate of flow of fluid through said motor.

8. A valve for controlling the direction and volumetric rate of flow of a fluid from an adjustable volume pressure source through a hydraulic motor, said valve comprising:
- a valve body;
- a direction bore formed in said valve body;
- an outlet chamber, an inlet port, and a pair of motor ports formed in said valve body and communicating with said direction bore;
- a direction controlling slidable spool positionable axially in said direction bore in either of two extreme positions for interconnecting either of said motor ports to said inlet port and the other of said motor ports to said outlet chamber for driving said motor in opposite directions, respectively, said spool being further positionable in said direction bore to a central position intermediate said extreme positions for interconnecting said inlet port directly with said outlet chamber thereby transmitting no motive power to said motor;
- means carried by said spool for forming and interconnecting an orifice between said other motor port and said outlet chamber as said spool slides between said central and either of said extreme positions for braking said motor as said spool slides toward said central position from either of said extreme positions;
- a flow rate bore formed in said valve body and communicating with said outlet chamber;
- an exhaust port in said valve body communicating with said flow rate bore;
- a movable flow rate controlling element in said flow rate bore having a passageway communicating with said outlet chamber at one end thereof and cooperating with said exhaust port to form a variable orifice at the other end thereof for selectively restricting the flow path between said exhaust port and said outlet chamber;
- means connected to said spool for limiting the rate of movement of said spool and movable element whereby rapid accelerations, decelerations and direction reversals of said motor are prevented;
- pressure compensator means responsive to the pressure differential across said variable orifice adjusting the output volume of said pressure source for maintaining said pressure differential constant; and
- means mechanically interconnecting said direction controlling spool and said flow rate controlling element for minimizing the area of said variable orifice when said direction controlling spool valve is in said central position and maximizing said area when said direction controlling spool is in either of said extreme positions, thereby coordinating simultaneous control of the direction and volumetric rate of flow of fluid through said motor.

9. A valve for controlling the direction and volumetric rate of flow of a fluid from an adjustable volume pressure source through a hydraulic motor, said valve comprising:
- a valve body;
- a direction bore formed in said valve body;
- an outlet chamber, an inlet port, and a pair of motor ports formed in said valve body and communicating with said direction bore;
- a direction controlling slidable spool positionable axially in said direction bore in either of two extreme positions for interconnecting either of said motor ports to said inlet port and the other of said motor ports to said outlet chamber for driving said motor in opposite directions, respectively, said spool being further positionable in said direction bore to a central position intermediate said extreme positions for interconnecting said inlet port and said outlet chamber thereby transmitting no motive power to said motor;
- means carried by said spool for forming and interconnecting a variable orifice between said other motor port and said outlet chamber as said spool slides between said central position and either of said extreme positions for braking said motor as said spool slides toward said central position from either of said extreme positions;
- a flow rate bore formed in said valve body and communicating with said outlet chamber;
- an exhaust port in said valve body communicating with said flow rate bore;
- a movable flow rate controlling element in said flow rate bore having a passageway communicating with said outlet chamber at one end thereof and cooperating with said exhaust port to form a variable orifice at the other end thereof for selectively restricting the flow path between said exhaust port and said outlet chamber;
- pressure compensator means responsive to the pressure differential across said variable orifice for adjusting the output volume of said pressure source for maintaining said pressure differential constant;
- a pair of check valves carried by said spool valve for interconnecting said inlet port and said motor ports to hydraulically block said motor and to supply make-up fluid to said motor when said spool is positioned to interconnect said inlet port and said outlet chamber; and
- means mechanically interconnecting said direction controlling spool and said flow rate controlling element for minimizing the area of said variable orifice when said direction controlling spool is in said central position and maximizing said area when said direction controlling spool is in either of said extreme positions for coordinating the simultaneous control of the direction and volumetric rate of flow of fluid through said motor.

10. A valve for controlling the direction and volumetric rate of flow of a fluid from an adjustable volume pressure source through a hydraulic motor, said valve comprising:
- a valve body;
- a direction bore formed in said valve body;
- an outlet chamber, an inlet port, and a pair of motor ports formed in said valve body and communicating with said direction bore;
- a direction controlling slidable spool positionable axially in said direction bore in either of two extreme positions for interconnecting either of said motor ports to said inlet port and the other of said motor ports to said outlet chamber for driving said motor in opposite directions, respectively, said spool valve being further positionable in said direction bore to a central position intermediate said extreme positions for interconnecting said inlet port and said outlet chamber thereby transmitting no motive power to said motor;
- means carried by said spool for forming and interconnecting an orifice between said other motor port and said outlet chamber as said spool slides between said central and either of said extreme positions for braking said motor as said spool slides toward said central position from either of said extreme positions;
- a flow rate bore formed in said valve body and communicating with said outlet chamber;
- an exhaust port in said valve body communicating with said flow rate bore;
- a movable flow rate controlling element in said flow rate bore having a passageway communicating with said outlet chamber at one end thereof and cooperating with said exhaust port to form a variable orifice at the other end thereof for selectively restricting the flow path between said exhaust port and said outlet chamber;
- pressure regulating means responsive to the pressure differential across said variable orifice for adjusting the output volume of said pressure source for maintaining said pressure differential constant;

a pair of check valves carried by said spool for interconnecting said inlet port and said motor ports to hydraulically block said motor ports and to supply make-up fluid to said motor ports when said spool is positioned to interconnect said inlet port and said outlet chamber;

means connected to said spool for limiting the rate of movement of said spool and movable element thereby preventing rapid accelerations, decelerations and direction reversals of said motor; and means mechanically interconnecting said direction controlling spool and said flow rate controlling element for minimizing the area of said variable orifice when said direction controlling spool is in said central position and maximizing said area when said direction controlling spool is in either of said extreme positions, thereby coordinating the simultaneous control of the direction and volumetric rate of flow of fluid through said motor.

11. A valve for controlling the direction and volumetric rate of flow of a fluid from an adjustable volume pressure source through a hydraulic motor, said valve comprising:

a valve body;

a direction bore formed in said valve body;

an outlet chamber, an inlet port, and a pair of motor ports formed in said valve body and communicating with said direction bore;

a direction controlling slidable spool positionable axially in said direction bore for selectively interconnecting either of said motor ports to said inlet port and the other of said motor ports to said outlet chamber for transmitting power to said motor to drive it in one of two directions, said direction controlling spool being alternately operable to interconnect said inlet port and said outlet chamber for transmitting no motive power to said motor;

a flow rate bore formed in said valve body and communicating with said outlet chamber;

an exhaust port in said valve body communicating with said flow rate bore;

a movable flow rate controlling element in said flow rate bore having a passageway communicating with said outlet chamber at one end thereof and cooperating with said exhaust port to form a variable orifice at the other end thereof for selectively restricting the flow path between said outlet chamber and said exhaust port;

means connected to said spool for limiting the rate of movement of said spool and movable element for preventing rapid accelerations, decelerations and direction reversals of said motor;

means in said direction bore for disabling said rate of movement limiting means over preselected zones of movement of said spool for permitting rapid movement of said spool valve in said preselected zone;

pressure regulating means responsive to the pressure differential across said variable orifice for adjusting the output volume of said pressure source for maintaining said pressure differential constant; and means mechanically interconnecting said direction controlling valve and said flow rate controlling element for minimizing the area of said variable orifice when said inlet port is interconnected with said outlet chamber and maximizing said area when said pressure port is interconnected with either of said motor ports, thereby coordinating the simultaneous control of the direction and volumetric rate of flow of fluid through said motor.

12. A valve for controlling the direction and volumetric rate of flow of a fluid from an adjustable volume pressure source through a hydraulic motor, said valve comprising:

a valve body;

a direction bore formed in said valve body;

an outlet chamber, an inlet port, and a pair of motor ports formed in said valve body and communicating with said direction bore;

a direction controlling means positionable in said direction chamber in either of two positions for interconnecting either of said motor ports to said inlet port and the other of said motor port to said outlet chamber for driving said motor in opposite directions, respectively, said direction controlling means being further positionable in said direction chamber to a third position for interconnecting said inlet port and said outlet chamber thereby transmitting no motive power to said motor;

a flow rate chamber formed in said valve body and communicating with said outlet chamber;

an exhaust port in said valve body communicating with said flow rate chamber;

a movable flow rate controlling element positioned in said flow rate chamber, said element having first and second passageways communicating with said outlet chamber at one end thereof and cooperating with said exhaust port to form a variable orifice at the other end thereof for selectively restricting the flow between said outlet chamber and said exhaust port;

pressure compensator means responsive to the pressure differential across said variable orifice for adjusting the output volume of said pressure source for maintaining said pressure differential constant; and means mechanically interconnecting said direction controlling means and said flow rate controlling element for blocking said first passageway when said direction controlling means is positioned in said third position, for blocking said second passageway when said direction controlling means is positioned in either of said first or second positions, and for partially blocking said first and second passageways when said direction controlling element is positioned intermediate said third position and either of said first or second positions, thereby coordinating the simultaneous control of the rate of fluid flow and the direction of said flow.

13. A valve for controlling the direction and volumetric rate of flow of fluid from an adjustable volume pressure source through a hydraulic motor, said valve comprising:

a valve body;

a direction chamber formed in said valve body;

an inlet port, an outlet chamber, and a pair of motor ports formed in said valve body and communicating with the direction chamber;

movable direction controlling means positioned in said direction chamber for selectively interconnecting either of said motor ports to said inlet port and the other of said motor ports to said outlet chamber whereby the direction of fluid flow through said motor is selectively reversible;

a flow rate chamber formed in said valve body and communicating with said outlet chamber;

an exhaust port in said valve body communicating with said flow rate chamber;

adjustable flow rate controlling means positioned in said flow rate chamber for selectively restricting the flow between said outlet chamber and said exhaust port;

pressure compensator means responsive to the pressure differential across said flow rate controlling means for adjusting the output volume of said pressure source for maintaining said pressure differential constant;

means connected to said direction controlling means for limiting the rate of movement of said direction controlling means whereby rapid accelerations, decelerations, and direction reversals of said motor are prevented; and means mechanically interconnecting said direction controlling means and said flow rate means for coordinating simultaneous control of the direction of flow through said motor and the volumetric rate of said flow.

14. A valve for controlling the direction and volumetric rate of flow of fluid from an adjustable volume pressure source through a hydraulic motor, said valve comprising:
   a valve body;
   a direction chamber formed in said valve body;
   an inlet port, an outlet chamber, and a pair of motor ports formed into the valve body and communicating with said direction chamber;
   movable direction controlling means positioned in said direction chamber for selectively interconnecting either of said motor ports to said inlet port and the other of said motor ports to said outlet chamber whereby the direction of fluid flow through said motor is selectively reversible;
   a pair of check valves carried by said direction controlling means for interconnecting said pressure port and the respective motor port to hydraulically block said motor and to supply make-up fluid to said motor when said spool is positioned to interconnect said inlet port and said outlet chamber directly;
   a flow rate chamber formed in said valve body and communicating with said outlet chamber;
   an exhaust port in said valve body communicating with said flow rate chamber;
   adjustable flow rate controlling means positioned in said flow rate chamber for selectively restricting the flow between said outlet chamber and said exhaust port;
   pressure compensator means responsive to the pressure differential across said flow rate controlling means for adjusting the output volume of said pressure source for maintaining said pressure differential constant; and
   means mechanically interconnecting said direction controlling means in said flow rate means for coordinating the simultaneous control of the direction of flow through said motor and the volumetric rate of said flow.

15. A valve for controlling the direction and volumetric rate of flow of a fluid from an adjustable volume pressure source through a hydraulic motor, said valve comprising:
   a valve body;
   a direction bore formed in said valve body;
   an outlet chamber, an inlet port, and a pair of motor ports formed in said valve body and communicating with said direction bore;
   a direction controlling slidable spool positionable axially in said direction bore in either of two extreme positions for interconnecting either of said motor ports to said inlet port and the other of said motor ports to said outlet chamber for driving said motor in opposite directions, respectively, said spool being further positionable in said direction bore to a central position intermediate said extreme positions for interconnecting said inlet port and said outlet chamber, thereby transmitting no motive power to said motor;
   a flow rate bore formed in said valve body and communicating with said outlet chamber;
   an exhaust port in said valve body communicating through said flow rate bore with said outlet chamber;
   a movable flow rate controlling element in said flow rate bore having a first passageway communicating with said outlet chamber at one end and cooperating with said exhaust port to form a variable orifice at the other end for selectively restricting the flow between said outlet chamber and said exhaust port, said element further having a second passageway in constant communication with said outlet chamber at one end and with said exhaust port at the other end;
   a pressure relief valve connected in said second passageway;
   pressure regulating means responsive to the pressure differential across said variable orifice for adjusting the volumetric output of said pressure source for maintaining said pressure differential contsant; and
   means mechanically interconnecting said direction controlling spool and said flow rate controlling element for minimizing the area of said variable orifice when said inlet port is interconnected directly with said outlet chamber and maximizing said area when said inlet port is interconnected with either of said motor ports, thereby coordinating simultaneous control of the direction and volumetric rate of flow of fluid through said motor.

16. A valve for controlling the direction and volumetric rate of flow of fluid from an adjustable volume pressure source through a hydraulic motor, said valve comprising:
   a valve body;
   a direction bore formed in said valve body;
   an outlet chamber, an inlet port, and a pair of motor ports formed in said valve body and communicating with said direction bore;
   a direction controlling slidable spool positionable axially in said direction bore for selectively interconnecting either of said motor ports to said inlet port and the other of said motor ports to said outlet chamber for transmitting power to said motor to drive it in one of two opposite directions, said direction controlling spool being selectively operable to directly interconnect said inlet port and said outlet chamber and to block communication between said inlet port and both of said motor ports;
   a flow rate bore formed in said valve body and communicating with said outlet chamber, said flow rate bore being substantially perpendicular to and offset from said direction bore;
   an exhaust port formed in said valve body communicating through said flow rate bore with said outlet chamber;
   a rotatably movable flow rate controlling element in said flow rate bore having a passageway communicating with said outlet chamber at one end and cooperating with said exhaust port to form a variable orifice at the other end for selectively restricting the flow between said outlet chamber and said exhaust port;
   pressure regulating means responsive to the pressure differential across said variable orifice for adjusting the volumetric output of said pressure source for maintaining the pressure differential constant; and
   a pin having one end eccentrically mounted to said element and the other end in engagement with said spool for mechanically interconnecting said direction controlling spool and said flow rate controlling element for minimizing the area of said variable orifice when said inlet port is connected directly with said outlet chamber and for maximizing said area when said inlet port is connected with either of said motor ports, thereby coordinating the simultaneous control of the direction and volumetric rate of flow of fluid through said motor.

17. A hydraulic system comprising:
   a valve body;
   a direction chamber formed in said valve body;
   an inlet port, an outlet chamber, and a pair of motor ports formed in said valve body and communicating with said direction chamber;
   a fluid pump, said pump having an outlet port communicating with said inlet port of said valve;
   a motor having two ports through which fluid flows to transmit power to said motor for driving a load, each of said two ports being in communication with different ones of said motor ports;

movable direction controlling means positioned in said direction chamber for selectively interconnecting either of said motor ports to said inlet port and the other of said motor ports to said outlet chamber whereby the direction of fluid flow through said motor is selectively reversible;

a flow rate chamber formed in said valve body and communicating with said outlet chamber;

an exhaust port in said valve body communicating with said flow rate chamber;

adjustable flow rate controlling means positioned in said flow rate chamber for selectively restricting the flow path between said outlet chamber and said exhaust port;

pressure compensator means responsive to the pressure differential across said flow rate controlling means for generating an output correlated with the variation in said pressure differential;

pump control means responsive to said output of said pressure compensator means for varying the volumetric output of said pump to thereby maintain said pressure differential substantially constant; and means mechanically interconnecting said direction controlling means and said flow rate means for coordinating control of the direction of flow through said motor and the volumetric rate of said flow.

18. A valve for controlling the volumetric rate of flow of fluid from an adjustable volume pressure source through a hydraulic motor, said valve comprising:

a valve body;

a first chamber formed in said valve body;

an inlet port, an outlet chamber, and first and second motor ports communicating with said first chamber;

movable means positioned in said first chamber for selectively interconnecting said first motor port with said inlet port and said second motor port with said outlet chamber thereby selectively establishing a flow path from said first chamber through said motor;

a flow rate chamber formed in said valve body and communicating with said outlet chamber;

an exhaust port in said valve body communicating with said flow rate chamber;

adjustable flow rate controlling means positioned in said flow rate chamber for selectively restricting the flow path between said outlet chamber and said exhaust port;

pressure compensator means responsive to the pressure differential across said flow rate controlling means for adjusting the volumetric output of said pressure source for maintaining said pressure differential constant; and means mechanically interconnecting said movable means and said flow rate means for coordinating the control of the establishment of said flow path through said motor and the volumetric rate of flow.

19. A spool valve for controlling the volumetric output of a pump for maintaining a constant pressure differential across an orifice, said spool valve comprising:

a valve body having a bore, an inlet port, an outlet port, and a sensing port, said bore communicating with said ports, said sensing port communicating with the upstream side of said orifice, said outlet port communicating with a fluid responsive control means operative to control the volumetric output of said pump in response to the input of fluid thereto, and said inlet port communicating with a source of pressurized fluid;

a spool slidably mounted in said bore and having a land for sealing said outlet port when said spool is positioned in an equilibrium position, said land having reduced diameter axial extensions for forming an orifice in conjunction with said outlet port to permit said sealing to be gradual; and biasing means for biasing said spool toward said sensing port to seal said outlet port with said land when said pressure differential is at said constant value and for permitting the flow of fluid between said inlet port and said fluid responsive control means through said outlet port when said pressure differential varies from said constant value thereby admitting and releasing fluid to said control means as needed to vary said pump output for re-establishing said pressure differential at said constant value.

20. A spool valve for controlling the volumetric output of a pump for maintaining a constant pressure differential across an orifice, said spool valve comprising:

a valve body having a bore, an inlet port, an outlet port, and a sensing port, said bore communicating with said ports, said sensing port communicating with a source of fluid having a pressure which varies in accordance with the variation in pressure differential across said orifice, said outlet port communicating with a fluid responsive control means operative to control the volumetric output of said pump in response to the input of fluid thereto and said inlet port communicating with a source of pressurized fluid;

a spool slidably mounted in said bore and having a land for sealing one of said inlet and outlet ports when said spool is positioned in an equilibrium position, said land having reduced diameter axial extensions for forming an orifice in conjunction with said outlet port to permit said sealing to be gradual; and biasing means for biasing said spool toward said sensing port to seal said one port with said land when said pressure differential is at said constant value and permitting the flow of fluid between said inlet and outlet ports when said pressure differential varies from said constant value thereby admitting and releasing fluid to said control means as needed to vary said pump output for re-establishing said pressure differential at said constant value.

21. A hydraulic valve having a body;

a bore in said body;

spaced inlet, outlet, and work ports in said body connecting with said bore;

a spool slidable axially in said bore for selectively interconnecting said ports;

means for moving said spool axially in said bore;

means forming a chamber for fluid at each end of said bore into which said spool is moved to displace fluid;

a pressure compensated flow control mechanism for each of said chambers, said pressure compensated flow control devices functioning to reduce the rate at which fluid can be displaced from its respective chamber in relation to the pressure in said chamber thereby limiting the rate of motion of said spool; and means for disabling one of said pressure compensated flow control devices in a certain range of spool movement.

22. In a valve having a bore sealed at one end and a spool slidably mounted in said bore, a spool movement controller comprising:

valve seat means mounted at the mouth of a cavity formed in the end of said spool adjacent said sealed end of said bore;

valve means in sliding contact with said bore and adapted to selectively seat on said valve seat means to seal said cavity;

an orifice formed in said valve means and constituting a restricted flow path between the region adjacent said valve seat and a chamber formed by said bore, said sealed bore end, and said valve means;

biasing means acting on said valve means for permitting said biased and normally unseated valve means to seat when the pressure in said chamber exceeds a predetermined value, thereby preventing said spool from advancing toward said sealed end if the spool-advancing force exceeds a predetermined level; and a fluid by-pass recess formed in the wall of said bore for permitting fluid to flow between said chamber and said valve seat region when said valve means is located intermediate the ends of said recess, thereby disabling said controller.

23. In a valve having a bore sealed at one end and a spool slidably mounted in said bore, a spool movement controller comprising:

valve seat means mounted at the mouth of a cavity formed in the end of said spool adjacent said sealed end of said bore;

valve means adapted to selectively seat on said valve seat means to seal said cavity;

piston means connected to said valve means for movement therewith, said piston means being in sliding contact with said bore an orifice formed in said piston means and constituting a restricted flow path between the regions separated by said piston means;

biasing means acting on said valve and piston means for permitting said biased and normally unseated valve means to seat when the pressure in the one of said regions constituted by said piston, said bore, and said sealed end exceeds a predetermined value, thereby preventing said spool from advancing toward said sealed end when the spool-advancing force exceeds a predetermined level; and a fluid by-pass recess formed in the wall of said bore for permitting fluid to flow between said regions when said valve means is located intermediate the ends of said recess, thereby disabling said controller.

No references cited.

EDGAR W. GEOGHEGAN, *Primary Examiner.*